United States Patent [19]

Ettel et al.

[11] Patent Number: 5,281,494
[45] Date of Patent: Jan. 25, 1994

[54] NICKEL HYDROXIDE

[75] Inventors: Victor A. Ettel; Juraj Babjak; Stephen J. Baksa, all of Mississauga; James A. E. Bell, Oakville, all of Canada

[73] Assignee: Inco Limited, Toronto, Canada

[21] Appl. No.: 519,530

[22] Filed: May 4, 1990

[51] Int. Cl.$^5$ ............................................. H01M 4/52
[52] U.S. Cl. .................................. 429/223; 252/182.1; 423/141; 423/594
[58] Field of Search ................ 429/223; 423/592, 594, 423/141, 144; 252/623.1, 182.1

[56] References Cited

U.S. PATENT DOCUMENTS 3,657,013  4/1972  Melin ................................. 429/223
4,053,578  10/1975  Hill et al. ............................ 423/592

OTHER PUBLICATIONS

Mellor, *Inorganic and Theoretical Chemistry*, vol. XV, Longmans, Green (1949) pp. 144–145.

Primary Examiner—Stephen Kalafut
Attorney, Agent, or Firm—Blake T. Biederman; Edward A. Steen

[57] ABSTRACT

A novel process for the production of nickel hydroxide wherein particulate nickel is reacted with oxygen in the presence of liquid water at a temperature of at least 180° C. The invention also includes the nickel hydroxide product so produced.

23 Claims, 3 Drawing Sheets

NICKEL HYDROXIDE

The present invention is concerned with nickel hydroxide [Ni(OH)$_2$] and its manufacture.

HISTORY OF THE ART AND PROBLEM AND OBJECTS OF THE INVENTION

For all practical purposes nickelous hydroxide [Ni(OH)$_2$, hereinafter designated as "nickel hydroxide" or "divalent nickel hydroxide" has always been made by precipitation from an aqueous solution containing a nickel salt, e.g. nickel sulfate, by addition of or admixture with an aqueous solution of an alkaline hydroxide, e.g. NAOH. When prepared in this manner nickel hydroxide is almost always contaminated with measurable amounts of the cation of the alkaline hydroxide and the anion of the nickel salt. Even though the by-product of precipitation, e.g. sodium sulfate, is very soluble in water, washing of the gelatinous nickel hydroxide precipitate is very difficult. Furthermore, the gelatinous precipitate almost always gives a low tap density nickel hydroxide product directly upon drying. One of the objects of the present invention is to provide a dry nickel hydroxide product which has a high tap density as directly produced after drying. A second object of the present invention is to provide a nickel hydroxide which is more crystalline and relatively pure compared to nickel hydroxide commercially available heretofore. The first and second objects of the invention are accomplished by the third object of the invention which is to provide a novel process for the manufacture of nickel hydroxide.

GENERAL DESCRIPTION OF THE INVENTION

Figure 1:
FIG. 1 is a reproduction of an electromicroscopic image of the nickel hydroxide of the present invention.

The present invention contemplates the production of nickel hydroxide by the following chemical reaction:

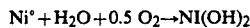

$$Ni° + H_2O + 0.5\ O_2 \rightarrow NI(OH)_2$$

The aforestated chemical reaction is carried out at a temperature of 50° or about 150° to about 300° C., preferably about 180° to about 230° C. and in at least one instance at a maximum of about 200° C. using a fine nickel metal powder such as produced by decomposition of nickel carbonyl [Ni(CO)$_4$] having a surface area of at least about 0.1 m$^2$/g. The reaction is carried out with an excess of water, generally in an autoclave or similar pressure proof reactor, at a steam partial pressure of about 10 to about 30 atmospheres (absolute) and a significant partial pressure of oxygen, e.g. above about 4 atmospheres and advantageously in the range of about 5 to about 25 atmospheres. Provision is made for continuous or intermittent supply of oxygen to satisfy the stoichiometry indicated by the foregoing equation. It is advantageous to provide means for agitating the reaction mixture so as to provide adequate contact of the gaseous, solid and liquid phases involved in the reaction. Low temperature of reaction; i.e. between 50° C. and 150° C., is generally useful when ammonia or ammonia plus ammonium salts is or are used as a reaction catalyst.

When the particle size of the nickel metal powder is sufficiently fine that the surface area of the powder exceeds about 1.5 m$^2$/g, the aforestated reaction will proceed, albeit slowly, in the absence of a catalyst. However, a catalyst which will facilitate the dissolution of nickel in water or provide divalent nickel ion in aqueous solution greatly increases the kinetics of the reaction using very fine nickel powder and is essential when coarser grades of nickel powder are used. Suitable catalysts include H$^+$(acids), Ni$^{++}$(nickel salts) or Co$^{++}$(cobalt salts) or compounds such as CO$_2$ capable of generating these ions in aqueous solutions in the presence of nickel powders. For example K$_2$S$_2$O$_8$ can be considered as one of such compounds, since it generates Ni$^{++}$ due to the reaction: Ni° + K$_2$S$_2$O$_8$ → Ni$^{++}$·SO$_4$$^=$ + K$_2$SO$_4$. Preferred catalysts can be selected from the group HCl, NiCl$_2$, H$_2$SO$_4$, NiSO$_4$, acetic acid, nickel acetate, HNO$_3$, Ni(NO$_3$)$_2$, formic acid, nickel formate, propionic acid, nickel propionate and at least 0.4 m/l ammonia in water with or without ammonium salts such as ammonium acetate, ammonium nitrate, ammonium sulfate, ammonium carbonate or ammonium chloride. In addition to ammonia and ammonium salts, various amines and imines can also act as catalysts in the present process. When ammonia or ammonium salts are used as catalysts the temperature of oxidation can be as low as 50° C. or so.

Even though catalysts may include alkali metal ions such as K$^+$ and anions such as SO$_4$$^=$, NO$_3$$^=$, NO$_3$$^=$, etc., the product produced by the process of the invention can generally be considered essentially free of such ionic species because of its crystalline nature and because the concentration of such species used as catalysts usually is significantly less than the concentration of such species encountered in the prior art precipitation process. Additional catalytic materials can comprise water soluble salts of metals lower than nickel in the electrochemical series, e.g. CuCl$_2$, Ag$_2$SO$_4$, etc. Using these materials, nickel will replace the copper or silver in solution and metallic copper or silver or other metal will appear as a dopant or contaminant in the product nickel hydroxide. One pitfall to avoid in the use of these materials is replacement in such fashion by copper, silver, etc. that the surface of the particulate nickel is masked. It may be necessary to add small amounts of soluble copper, silver, etc. salts in increments or continuously over the course of the nickel oxidation reaction. It has been found that catalysts in the amount of about 0.005 to 0.4 mole equivalent (based on solubilized nickel) per liter of nickel powder-water slurry containing about 2 to about 30% nickel metal are sufficient to effectively catalyze reaction of nickel, oxygen and water in accordance with the invention when the feed nickel powder has a surface area in excess of about 0.1 m$^2$/g. Ordinarily, catalyst stable in the presence of oxygen will be present in the reaction system in an amount of at least about 0.005 and up to about 0.1 mole equivalent of catalyst per liter of process water.

Those skilled in the art will appreciate that catalysts mentioned in the preceding paragraph particularly as preferred or advantageous catalysts are taken from the group of ordinary, industrially available, cheap materials. While these materials are preferred because of their operability, availability and low price, they are not the only catalysts which could be used. For example, in the realm of organic acid catalysts, substituted low molecular weight aliphatic monobasic acids which contain no hydrophylic groups and up to about four carbon atoms in the carbon chain can be operative. Such acids (and nickel or cobalt salts thereof) can include mono, di or tri chloracetic acid, chloropropionic acid, etc. When a significant amount of hydrophylic substitution is present on an aliphatic monobasic acid so as to confer enhanced water solubility on the acid, the carbon chain length can be greater. Suitable catalysts of this nature include lactic acid, glycolic acid and aldonic acids. Some dicarboxylic organic acids can be used as catalysts or catalyst precursors. Malic and tartaric acids are useful catalysts directly. Oxalic acid is an example of a dicarboxylic acid which is a catalyst precursor. Ordinary chemical experience suggests that oxalic acid would not be a suitable catalyst because of the extreme insolubility of nickel oxalate in water. However, apparently under reaction conditions of the process of the present invention, oxalic acid breaks down to yield an active catalytic acid, likely formic acid. Thus, oxalic acid and many other organic materials, e.g. malonic acid, aldehydes and others can provide the catalytic effect required when heated in aqueous solution in the presence of oxygen at a temperature in excess of about 180° C.

Although it is a prime purpose of the process of the present invention to produce pure nickel hydroxide, there can be circumstances when it is desirable to provide nickel hydroxide with controlled amounts of impurity. For example, for battery purposes, e.g. nickel-cadmium or nickel-iron rechargeable battery cells, it may be advantageous to include cobalt, cadmium or barium in nickel hydroxide or to provide for doping amounts of lithium in the nickel hydroxide crystal structure. Cobalt, in amounts of about 1 to 5% of the nickel, can be included in the reaction mixture as a dopant precursor, e.g. water-soluble salt, (e.g. cobalt acetate), to serve as a catalyst or, in larger amounts, can be introduced as fine metal powder either per se or as nickel-cobalt alloy powder. Small amounts of lithium as a water-soluble salt, e.g. lithium acetate or lithium chloride also can be included in the aqueous phase of the water-nickel metal slurry employed in carrying out the process of the present invention. Barium can be added to water of the reaction slurry as a soluble salt, care being taken when barium is present to avoid sulfate ion or other barium precipitants. When deliberate impurities are added to nickel hydroxide for electrochemical purposes it may be advantageous to provide equipment in which reaction is to take place with means, such as high pressure pumping means, to add the impurity, e.g. cobalt, cadmium, etc. as a salt or compound dissolved in water over the course of the reaction or possibly, more advantageously, in a short period of time near the end of the reaction, e.g. in the last quarter of the reaction time. In a similar manner, the amount of impurity or dopant addition can be increased or decreased over the course of the reaction. For use in rechargeable nickel-cadmium batteries, cadmium in amounts up to about 3% or higher in nickel hydroxide can be very useful.

It has been found that the aqueous slurry oxidation of nickel powder made by decomposition of nickel carbonyl can be accomplished in about 6 to 24 hours under conditions of 200° C. temperature, 33 atmospheres absolute total pressure and a weight ratio of elemental nickel powder to slurry water in the range of 0.015 to 0.3 using no catalyst with ultra-fine (>1.5 m$^2$/g) powder and various catalysts with coarser powders.

Figure 2:
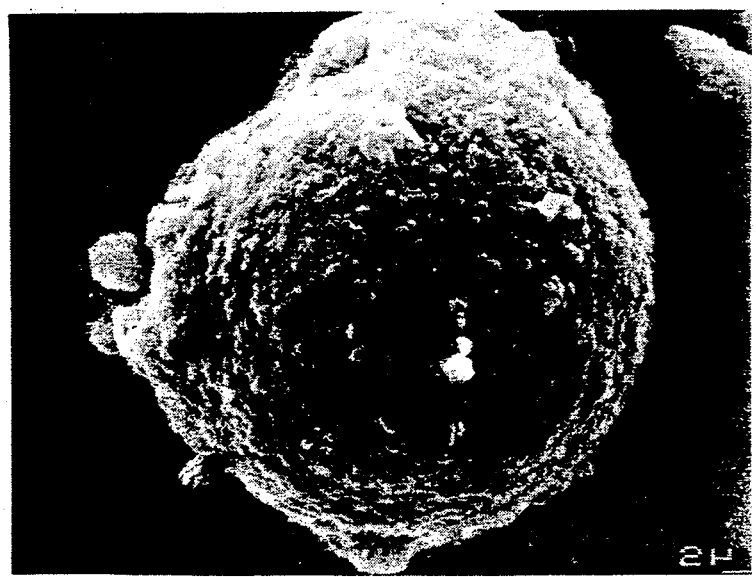
FIG. 2 is a reproduction of an electromicroscopic image of prior art nickel hydroxide at the same magnification as FIG. 1 provided for comparative purposes.
Figure 3:
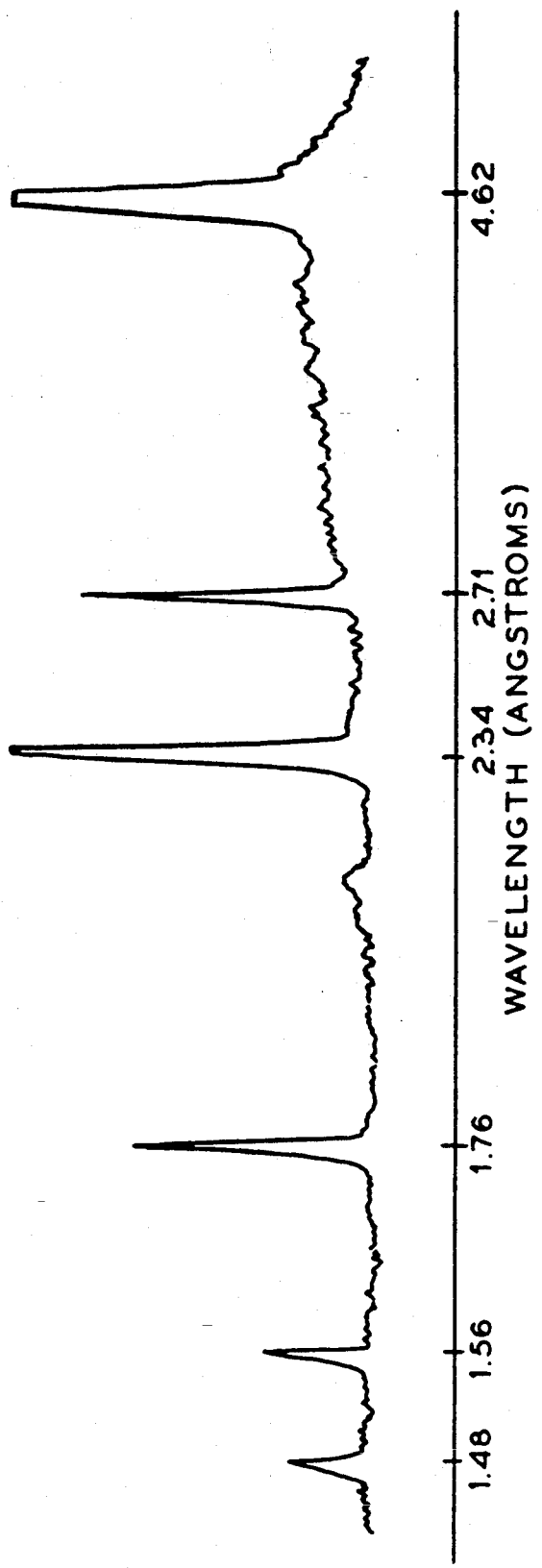
FIG. 3 is a graph of X-ray diffraction peaks exhibited by the nickel hydroxide of the present invention.
Figure 4:
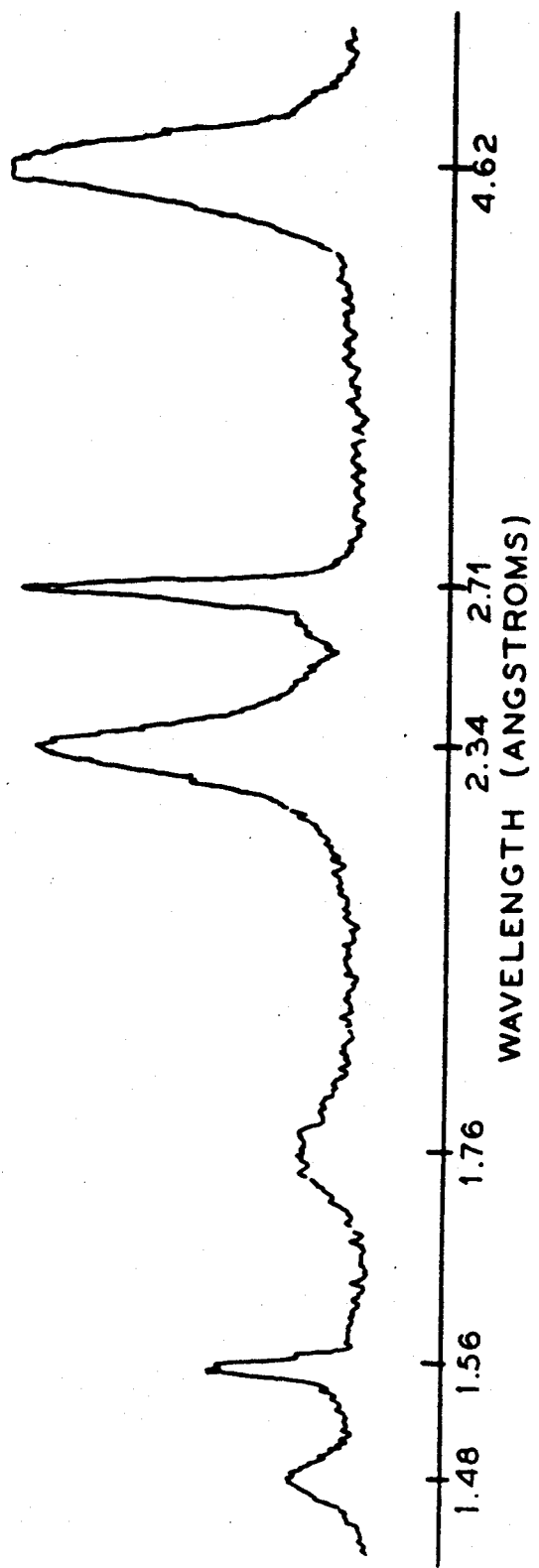
FIG. 4 is a similar graph of X-ray diffraction peaks exhibited by prior art nickel hydroxide.

The product of the aforedescribed process, nickel hydroxide [Ni(OH)$_2$] is unique in several ways. Specifically, it exhibits significant crystallinity and a non-aggregated hexagonal structure as depicted in FIG. 1 of the drawing. This structure is to be compared with the aggregated structure of nickel hydroxide produced by the precipitation method as depicted in FIG. 2 of the drawing. The non-aggregated crystalline structure of the nickel hydroxide product of the present invention usually results in a relatively high tap density of at least about 0.9 g/ml whereas the product depicted in FIG. 2 of the drawing has a tap density of about 0.5 g/ml. The tap density of the prior art product can be increased by mechanical processing, e.g. grinding. The tap density of nickel hydroxide of the present invention can be varied by varying the rate of crystallization during reaction. A slow reaction and crystallization can produce extremely thin (e.g. about 50 nanometers) hexagonal platelet crystals which give a very low tap density whereas rapid reaction and crystallization results in the usual product described above. The difference between prior art products and those of the present invention are also illustrated by FIGS. 3 and 4 of the drawing. These figures depict the X-ray diffraction peak broadening of a typical product of the present invention (FIG. 3) and a prior art product (FIG. 4). The pattern of the product of the invention generally shows more precise, sharp peaks compared to those of the prior art product. Most particularly, the peak at 62° (1.75Å) is precisely acicular in the pattern of the product of the present invention whereas the corresponding peak in the pattern of the prior art product is scarcely distinguishable from the background noise.

When cobalt, cadmium, barium, lithium or any other adulterant or dopant is added to the reaction mixture producing the nickel hydroxide of the present invention, the resultant nickel hydroxide will contain such materials either essentially uniformly throughout its crystal structure or the dopant or adulterant can be concentrated at the core of, the surface of or in intermediate layers of the nickel hydroxide crystal structure. For electrochemical purposes, cobalt in the surface layers of nickel hydroxide is especially advantageous in increasing the capacity and life of positive active material used in nickel-cadmium and nickel-iron rechargeable (accumulator) cells. Although the presence of cobalt throughout the crystal structure of nickel hydroxide has the same electrochemical effect, concentrating the cobalt adulterant in the surface layer of nickel hydroxide crystals is sufficiently advantageous such that the present invention specifically contemplates provision of such nickel hydroxide wherein the crystal surfaces are enriched with cobalt. This surface enriched structure can be produced by adding cobalt salt, e.g. cobalt acetate or cobalt chloride to the slurry reaction mixture in the late stages of reaction, for example, in the last hour or two of an 8 to 24 hour reaction period. Nickel hydroxide for use in nickel-iron electrochemical cells and in nickel-cadmium-pocket cells normally is used in conjunction with potassium hydroxide electrolytes containing lithium hydroxide. One theory concerning the effect of the lithium ion on the life of nickel hydroxide positive electrodes postulates insertion of lithium into the nickel hydroxide crystal lattice during electrochemical cycling in initial formation and chargedischarge use of electrochemical cells. The present invention specifically contemplates nickel hydroxide made by the aforedescribed process of the invention which contains lithium in its crystal lattice, either uniformly throughout the crystal structure or concentrated or enriched in the inner, outer or middle layer of the crystal structure. Furthermore, the present invention contemplates nickel hydroxide doped with cadmium advantageously dispersed in fine particles throughout the nickel hydroxide crystal lattice, the cadmium being present as oxide, hydroxide or metal. More broadly, the present invention contemplates the use of the nickel hydroxide of the present invention, whether doped or not and whether containing elemental nickel or not, in association with mechanical elements and electrolyte of rechargeable electrochemical cells, e.g. nickel-iron or nickel-cadmium cells. In this sense "mechanical elements" includes battery plaques, pocket structures, leads, etc. all conventional in the battery art. The electrolyte is usually aqueous KOH solution with or without added lithium.

It is also within the contemplation of the present invention to provide nickel hydroxide which contains some elemental nickel. For electrochemical purposes elemental nickel as an electronic conductor substantially uniformly distributed throughout a nickel hydroxide mass can be advantageous. Thus, it is contemplated that in a nickel hydroxide of the present invention elemental nickel can comprise up to about 30% the nickel content of the material. This elemental nickel is present as ultra-fine particulates, and, as such, is subject to oxidative reaction during electrochemical charging in an alkaline electrolyte as well as serving as an electronic conductor in rechargeable battery usage. Ultra-fine particulate nickel is produced in nickel hydroxide by stopping the oxidation reaction when about 70% to 95% of nickel metal has been converted to hydroxidic form. The product nickel hydroxide contains at least about 70% non-elemental nickel.

In producing the nickel hydroxide of the present invention, it is advantageous to use a chloride, sulfate or acetate in nickel salt or acid form as the catalyst. As might be expected, especially when using sulfate or chloride as the catalyst, the amount of sulfate or chloride contamination of the hydroxide product increases with increasing concentration of the sulfate or chloride catalyst in the reaction process water, assuming the amount of nickel oxidized being maintained constant. As the amount of nickel slurried in a given volume of process water containing a fixed concentration of chloride catalyst increases, the percent of chlorine in the product nickel hydroxide decreases. In addition, fixing the quantity of process water and the concentration of chloride catalyst and slurried nickel in that water, there is a minor tendency for chlorine contamination in the product nickel hydroxide to decrease with increasing temperature over the range 180° C. to 230° C. Results of kinetic tests involving various amounts of chloride catalysts indicate that, if a product chlorine specification of 0.5% maximum is to be maintained, the chloride catalyst should be present in the process water in an amount less than about 0.08 Eq Cl/L, and process conditions should be about 10-12 hours reaction time at 200° C. using a total steam plus oxygen pressure of about 35 atmospheres absolute. Similarly, using a sulfate catalyst, to maintain a maximum of 1% sulfate impurity in the product, the catalyst concentration should be less than 0.05 Eq/L, and reaction time should be about 20 hours at 200° C. and 35 atmospheres absolute total pressure. Washing of product hydroxide with water or aqueous alkali solution appears to have little effect in reducing anionic contamination in the product nickel hydroxide. When 0.0526 Eq/L of acetate as nickel acetate was used as a catalyst, the product nickel hydroxide was found to contain about 0.1% elemental nickel and 0.34% carbon. By calculation in the nickel acetate test, run on 200 grams of nickel powder dispersed in 1300 mL of aqueous nickel acetate solution at a temperature of 200° C. and a total pressure of 35 atmospheres absolute, approximately 99.85% of the nickel was converted to the hydroxide. When using a carboniferous catalyst such as nickel or cobalt acetate or acetic acid it is important to avoid reaction temperatures in excess of about 200° C. At 210° C. and above, when using an acetate catalyst, the reaction rate decreases compared to the reaction rate at 200° C. and lower.

In order to give those skilled in the art a greater appreciation of the advantages of the invention, the following examples are given.

EXAMPLE I

One hundred grams (100 g) of type 255 filamentary nickel powder sold by INCO SPECIALTY POWDER PRODUCTS, Park 80 West-Plaza Two, Saddle Brook, N.J. having a particle size of 2.2-2.8 micrometers, a surface area of about 0.6 m$^2$/g and an apparent density of 0.5-0.65 g/cc was slurried in 1300 mL of water containing 0.207 Eq/L of nickel chloride. This slurry was introduced into an agitated autoclave and reacted with oxygen on demand at a total pressure of 35 atmospheres absolute for seven hours at a temperature of 180°-182° C. The grey product, nickel hydroxide, contained 62% total nickel, 0.13% elemental nickel, 31% oxygen and 1.33% chloride representing a 99.79% conversion of elemental nickel to divalent hydroxidic nickel.

EXAMPLE II

A slurry charge identical to that of Example I, except that it contained 0.1035 Eq/L of nickel chloride, was reacted with oxygen in the same apparatus for 6 hours at the same total pressure, but at a temperature of 200° C. The grey product hydroxide contained 0.61% elemental nickel, 0.81% chlorine and represented a 99% conversion of nickel metal to nickel hydroxide.

EXAMPLE III

Approximately the same slurry charge to the same autoclave as in Example II, but containing 0.1033 Eq/L HCl as catalyst was reacted with oxygen for 5.5 hours at 220° C. and a total pressure of 41 atmospheres absolute. The greenish grey nickel hydroxide product contained 62.9% total nickel, 0.061% elemental nickel and 0.53% chlorine. This product represented a 99.9% conversion of elemental nickel to nickel hydroxide.

EXAMPLE IV

Two hundred grams of the same nickel powder used in Examples I, II and III was slurried in 1300 mL of water containing 0.0126 Eq/L of sulfuric acid. This slurry was reacted with oxygen on demand in an agitated autoclave at 200° C. under a total pressure of 35 atmospheres absolute for 18 hours. The product nickel hydroxide contained 68.2% total nickel, 14.6% elemental nickel and 0.29% SO$_4$. This product represented a conversion of 78.59% of elemental nickel to nickel hydroxide. Results from similar runs differing only in amount of sulfuric acid catalyst and reaction time are set forth in Table I.

TABLE I

| Identification | $H_2SO_4$ Eq/L | Time (Hrs.) | Ni° in Prod. (%) | % Converstion Ni°→$Ni^{2+}$ |
|---|---|---|---|---|
| Comparative A | 0.1970 | 6 | 50.6 | 34.79 |
| Example V | 0.0492 | 19 | 1.61 | 97.49 |
| Comparative B | 0.0046 | 22 | 51 | 38.11 |

The data in Table I show that even with a large amount of sulfuric acid as catalyst 6 hours is too short a time to produce a satisfactory nickel hydroxide and that too little catalyst will result in an unsatisfactory nickel hydroxide when reacting 255 powder with oxygen even though sufficient time (22 hours) is allowed for reaction. Example V shows that using a proper amount of catalyst and allowing a proper reaction time (19 hours) a good product can be obtained. Specifically, the product of Example V contained 0.29% $SO_4$.

EXAMPLE VI

Using the 255 grade nickel powder, 200 grams of nickel metal were slurried in 1300 mL of water containing 0.0526 Eq/L of nickel acetate. This slurry was reacted in an autoclave equipped with an agitator with oxygen on demand at 200° C. for 19 hours under a total pressure of 35 atmospheres. The resultant product was a silver grey nickel hydroxide having a tap density of 0.894 g/mL which contained 63.9% total nickel, 0.097% elemental nickel and 0.34% carbon representing a 99.85% conversion of nickel metal to nickel hydroxide.

EXAMPLE VII

A preparation identical to that of Example VI except for use of acetic acid as catalyst and a 23 hour reaction time produced a product very similar in chemical composition to the product of Example VI except that it contained 0.38% elemental nickel. The tap density of the product of this example was 0.432 9/mL substantially lower than the tap density of the product of Example VI.

EXAMPLE VIII

To show the relative reactivity of nickel powder of various particle sizes as indicated by surface area per unit weight, two nickel powders, one type 255 (0.6 $m^2/g$) and an experimental ultrafine powder (2 $m^2/g$) were reacted in aqueous slurry with oxygen in the absence of a catalyst. Reaction conditions were:
  Temperature: 200° C.±2° C.
  Total Pressure: 33.6 Atmospheres Absolute
  Water Volume: 1.3 L
  Powder Weight: 20 g
After 6.5 hours the product mass using the ultra-fine nickel powder was 27.9 grams whereas the product mass using the 255 grade of nickel powder was 21.34 grams. Under identical conditions, but using 0.013 Eq/L of sulfuric acid as catalyst, twenty grams of ultra-fine nickel powder produced about 33.5 grams of nickel hydroxide product in 7.0 hours. This example shows directly and in the absence of a catalyst that the experimental ultra-fine nickel powder is more reactive for purposes of the present invention than the coarser type 255 powder and indirectly, by comparison with Examples IV and V that, in the presence of sulfuric acid as the catalyst, the ultra-fine nickel powder reacts faster than the type 255 powder. It should be noted that 100% conversion of 20 grams of nickel to nickel hydroxide theoretically results in a product mass of 31.58 grams, a 57.9% increase in weight.

EXAMPLE IX

The importance of nickel powder surface area is indicated by a scoping test under the reaction conditions set forth in Example VIII using 0.0028 Eq/L potassium peroxydisulfate ($K_2S_2O_8$) as catalyst and 20 grams of each of the nickel powders. Results of this scoping test are set forth in Table II.

TABLE II

| Nickel Powder Designation | Surface Area ($m^2/g$) B.E.T. Measurement | Reaction Time (Hours) | % Increase in Wt. of Product |
|---|---|---|---|
| A | 0.05 | 5.25 | 0 |
| HDNP* | 0.22 | 5.5 | 15.5 |
| 123* | 0.45 | 6.25 | 32.9 |
| 255* | 0.60 | 7.25 | 50.0 |

*Product obtainable from INCO SPECIALTY POWDER PRODUCTS, Park 80 West-Plaza Two, Saddle Brook, NJ.

The data in Table-II clearly show that, under the reaction conditions specified, the relatively low surface area powders either did not react with water and oxygen or did so slowly. For practical purposes it is recommended that the process of the present invention be carried out employing nickel powder having a B.E.T. derived surface area in excess of about 0.2 $m^2/g$ and advantageously in excess of 0.3 $m^2/g$. It is, however, within the contemplation of the invention to carry out the process of the invention employing any available nickel powder which can be activated, if necessary, to react in the presence or absence of a catalyst with water and oxygen.

Examples of the use of ammonia or mixtures of ammonia and ammonium salts in catalyzing the conversion of nickel powders, in aqueous solutions, into nickel hydroxide and/or basic nickel salts follow.

Tests were conducted in a 2 L autoclave using 200 g of nickel powder having a surface area of about 0.6 $m^2/g$ and 1.3 L of an ammoniacal solution, of different composition, at various temperatures and pressures.

Nickel powder was reacted in ammonium hydroxide solutions containing 0.4 to 15 moles/L of $NH_3$ at 100°-200° C. and 28-35 atmospheres absolute (At.A) total pressure (11.3-25 At.A oxygen partial pressure).

EXAMPLE X

Tests were performed at different ammonia concentrations in the feed solution. The results are summarized in Table 111.

TABLE III

| $NH_3$ (mol/L) | Total Pressure (At.A) | Temp. (°C.) | Time (hr) | Ni Conv. (%) | Tapped Density (g/$cm^3$) |
|---|---|---|---|---|---|
| 0.4 | 29 | 200 | 18 | 46.5 | 1.57 |
| 1 | 29 | 200 | 18 | 65.7 | 1.61 |
| 2 | 29 | 200 | 16.7 | 87.5 | 1.84 |
| 4 | 29 | 200 | 21 | 99.4 | 1.46 |
| 6 | 30 | 180 | 21.7 | 99.5 | 1.83 |
| 8 | 32 | 170 | 19.3 | 99.8 | 1.89 |

The data in Table III show that the reaction rate increases with ammonia concentration in the solution.

EXAMPLE XI

Tests were conducted at a constant ammonia concentration in the feed solution and a constant total pressure, but at a variable temperature. The results are shown in Table IV.

TABLE IV

| $NH_3$ (mol/l) | Total Pressure (At.A) | Temp. (°C.) | Time (hr) | Ni Conv. (%) | Tapped Density (g/cm$^3$) |
|---|---|---|---|---|---|
| 8 | 32 | 125 | 26 | 88.4 | 1.08 |
| 8 | 32 | 150 | 22.3 | 99.9 | 1.73 |
| 8 | 32 | 170 | 19.3 | 99.8 | 1.89 |
| 8 | 32 | 180 | 20 | 100 | 1.76 |

It is apparent that the reaction rate increases with temperature rather than strongly (at a constant total pressure, the oxygen partial pressure decreased from 24 At.A to 9.5 At.A as the temperature increased from 125° to 180° C., yet the reaction rate increased in this interval).

The following observations have been made from Examples X and XI:

- The reaction rate increases strongly with ammonia concentration in the solution and with operating temperature;
- High nickel conversions can be achieved in ammonium hydroxide solutions only at elevated temperatures and oxygen partial pressures;
- 99%+ nickel conversion can be achieved, e.g. at 170° C., 32 At.A total pressure in 20-24 hours of batch reacting using 6-8 molar $NH_3$ feed solution;
- The density of the produced nickel hydroxides increases, within limits, with ammonia concentration and with operating temperature; and
- The produced nickel hydroxides are of a very high crystallinity and purity (generally 0.005% total $NH_3$) and should be suitable, for example, as active material for nickel electrode in a battery environment.

The conversion of Ni powders into nickel hydroxide in ammonium hydroxide solutions can be achieved, at practical rates, only at elevated temperatures and oxygen partial pressures. At lower temperatures and oxygen partial pressures the rate of Ni conversion is impractically slow. For example, only about 0.1% Ni dissolved in a 10 molar $NH_3$ solution at 55° C. and 2 At.A oxygen partial pressure during 4 hours of batch reaction. We have discovered that the rate of nickel conversion can be enhanced substantially even at temperatures below 100° C. by incorporating an ammonium salt into the ammonia feed solution, as shown in Examples XII and XIII.

EXAMPLE XII

TABLE V

| $NH_3$ (mol/L) | X (Eq/L) | $O_2$ Pressure (At.A) | Temp. (°C.) | Time (hr) | Ni Conv. (%) | Tapped Density (g/cm$^3$) |
|---|---|---|---|---|---|---|
| 8 | None | 5.4 | 90 | 19 | 9.5 | — |
| 4 | 0.5 Ac* | 3.1 | 90 | 21.7 | 72.5 | 1.34 |
| 4 | 0.5 $NO_3$ | 2.7 | 90 | 21.5 | 94.8 | 1.31 |
| 4 | 0.5 $CO_3$ | 3.5 | 90 | 22.6 | 85.5 | 0.523 |
| 8 | 1.0 Cl | 5.7 | 90 | 5.8 | 99.7 | 0.635 |

*Ac = Acetate

The data in Table V show that the incorporation of an anion into the ammoniacal feed solution results in increasing the reaction rate very dramatically. It appears that anions of strong acids have a stronger effect on the reaction rate than those of weak acids.

The improvement in the reaction rate is also demonstrated by two tests. In the first case Ni powder was reacted in an 8 molar ammonia solution at 180° C., 32 At.A total pressure, 9.1 At.A oxygen partial pressure and in the second case in an 8 molar total $NH_3$, 2 molar total $CO_2$ solution at 90° C., 3.9 At.A oxygen partial pressure. The reaction rate was an order of magnitude more rapid in the second case compared to the reaction rate in the first case.

EXAMPLE XIII

Experiments were conducted under different operating conditions, using various ammonia/ammonium carbonate solutions. The results are summarized in Table VI.

TABLE VI

| $NH_3$ (mol/L) | $CO_3$ (Eq/L) | $O_2$ Pressure (At.A) | Temp. (°C.) | Time (hr) | Ni Conv. (%) | $CO_3$ (%) | Density (g/cm$^3$) |
|---|---|---|---|---|---|---|---|
| 4 | 0.25 | 3.5 | 90 | 22.6 | 85.5 | 2.5 | 0.523 |
| 4 | 0.5 | 3.56 | 90 | 23.1 | 99.9 | 3.81 | 0.523 |
| 4 | 0.75 | 4.66 | 90 | 19.6 | 97.8 | 4.19 | 0.590 |
| 6 | 0.75 | 3.56 | 90 | 4.5 | 99.3 | 5.90 | 0.698 |
| 8 | 1 | 5.4 | 60 | 5.9 | 98.7 | 4.89 | 0.647 |
| 8 | 1 | 3.63 | 70 | 3.7 | 98.1 | 5.89 | 0.485 |
| 8 | 1 | 3.9 | 90 | 2.1 | 99.7 | 6.06 | 0.634 |
| 8 | 1.5 | 3.77 | 90 | 1.68 | 99.4 | 10.9 | 0.761 |
| 8 | 2 | 3.77 | 90 | 1.67 | 97.1 | 15.3 | 1.19 |
| 8 | 2 | 1* | 90 | 5.4 | 99.8 | 23.1 | 1.35 |
| 8 | 1 | 11.3 | 150 | 3.0 | 99.9 | 4.94 | 1.086 |

*The oxygen was added at a slow rate

The following observations were made:

- The incorporation of an anion, such as, e.g. carbonate, chloride, nitrate or acetate to an ammonia solution greatly enhances the rate of an aqueous oxidation of nickel powders and their conversion to nickel hydroxide/basic nickel salt. The anions of strong acid have a stronger effect upon the rate than those of weak acids;
- Product density can be effected by the feed solution composition (e.g. $NH_3$—$CO_2$ concentrations) and by operating conditions (temperature, reaction rate, by controlling the oxygen rate) and can be varied from about 0.3 to around 1.4 g/cm$^3$; and
- Basic nickel carbonates of different $CO_3$—content can be obtained by varying the $NH_3$/$CO_2$ ratio in the feed solution.

It should be noted that ammonium salts other than carbonate, acetate, nitrate or chloride give very similar effects.

The product of the present invention, after drying, is a flowable powder generally greyish in color and having a slight to nil reaction to a magnetic field (indicative of unreacted nickel). The color of the nickel hydroxide of the invention can be strongly influenced by impurities in the original nickel powder or introduced by inadvertence or deliberately during reaction. While the development of the present invention has been carried out using pure nickel powder conveniently available in the form of powder derived from nickel carbonyl especially for the purpose of producing battery-grade nickel hydroxide, it is within the contemplation of the invention to employ any nickel powder of any degree of purity available to the art which will react with water and oxygen as taught herein.

In accordance with the invention, products comprising nickel hydroxide/basic nickel carbonates can be produced using $CO_2$ or, more properly $H_2CO_3$ and its ionization products, as the catalyst. Specific instances of this aspect of the process of the present invention are set forth in Example XIV.

EXAMPLE XIV

Tests were performed in a 2 liter autoclave using 200 grams of nickel powder, having a surface area of about 0.6 $m^2/g$, and 1.3 liters of water at various temperatures and the total pressure of about 28.4 atmospheres absolute. The results are summarized in Table VII.

TABLE VII

| Temp. ( ) | Feed Gas $CO_2/O_2$ | Time (hr) | Product (%) $Ni_{tot}$ | Product (%) $Ni^*$ | Product (%) $CO_3$ | Ni Conv. (%) | $CO_3/Ni$ (mol/mol) |
|---|---|---|---|---|---|---|---|
| 125 | 0.5 | 27.4 | 55.5 | 17.5 | 20.1 | 68.5 | 0.518 |
| 125 | 1.0 | 23.9 | 54.5 | 13.0 | 30.2 | 76.1 | 0.712 |
| 125 | 2.0 | 29.0 | 60.0 | 23.8 | 23.0 | 60.3 | 0.662 |
| 125 | 2.0 | 25.9 | 55.0 | 12.5 | 26.1 | 77.3 | 0.601 |
| 150 | 1.0 | 21.8 | 52.5 | 0.49 | 20.1 | 99.1 | 0.378 |
| 175 | 1.0 | 24.0 | 73.5 | 38.6 | 12.5 | 47.5 | 0.350 |

Table VII shows that $CO_2$ is a suitable catalyst for converting Ni powders into nickel hydroxide/basic nickel carbonates. Products of different carbonate content can be obtained by varying the ratio of the oxygen/carbon dioxide feed mixture and the operating temperature. The process based on $CO_2$ catalyst is fully acceptable from an environmental point of view, because no liquid or gas pollutant is generated.

While in accordance with the provisions of the statute, there is illustrated and described herein specific embodiments of the invention, those skilled in the art will understand that changes may be made in the form of the invention covered by the claims and that certain features of the invention may sometimes be used to advantage without a corresponding use of the other features.

We claim:

1. A process for the production of nickel hydroxide comprising:
   a) reacting particulate metallic nickel with oxygen;
   b) in the presence of at least an equal molar amount of liquid water at
   c) a reaction temperature in excess of about 50° C.;
   d) and in the presence of a catalyst in the event
      (1) the temperature of reaction is below 210° C., or
      (2) the surface area of said particulate nickel is less than about 1.5 $m^2/g$; and
   e) provided that in the event a catalyst from the group of ammonia and ammonium salts is used, the temperature of reaction is between 50° C. and 150° C.

2. A process as in claim 1 herein said particulate nickel has a surface area of at least about 0.1 $m^2/g$.

3. A process as in claim 1 wherein said reaction temperature is in the range of about 180° C. to about 230° C.

4. A process as in claim 1 wherein said reaction is carried for at least that amount of time necessary to convert at least about 50% of said metallic nickel present in the reaction mass to hydroxidic nickel.

5. A process as in claim 1 wherein a catalyst capable of maintaining nickel in aqueous solution and stable in the presence of oxygen is present during at least part of said reaction.

6. A process as in claim 5 wherein said catalyst is present throughout said reaction.

7. A process as in claim 6 wherein said catalyst is selected from the group consisting of sulfuric acid, hydrochloric acid, nitric acid, formic acid, acetic acid, carbon dioxide, nickel and cobalt salts of sulfuric, hydrochloric, nitric, formic and acetic acids, peroxydisulfates, water-soluble salts of metals below nickel in the electrochemical series, ammonium hydroxide and ammonium hydroxide plus ammonium salts.

8. A process as in claim 5 wherein said catalyst is present in an amount of at least about 0.005 mole equivalent per liter of process water.

9. A process as in claim 1 wherein said nickel powder is present in said liquid water in an amount of about 2 to 30% nickel metal by weight.

10. A process as in claim 4 wherein said reaction is carried out for at least that amount of time necessary to convert at least about 90% of said metallic nickel to hydroxidic nickel.

11. A process as in claim 10 wherein said amount of time is between about 6 and 24 hours.

12. A process as in claim 11 wherein sulfate ion is present as the anion of a catalyst and the reaction is carried out for about 18 to 24 hours at about 180° C. to 230° C.

13. A process as in claim 1 wherein a nickel hydroxide dopant precursor is present as a solute in said liquid water during at least part of said reaction.

14. A process as in claim 13 wherein said dopant precursor is selected from the group of cobalt, cadmium, lithium and barium ions.

15. A process as in claim 1 wherein said reaction is stopped when about 70% to 95% of nickel metal has been converted to hydroxidic form.

16. A composition of matter including nickel hydroxide and up to 30%, based upon total weight of nickel, of finely divided elemental nickel dispersed therethrough, said composition of matter comprising essentially non-aggregated, hexagonal nickel hydroxide crystals up to about 2 micrometers in major dimension and characterized by a sharply peaked X-ray absorption spectrum especially at a wavelength of 1.75 Angstrom units as depicted in FIG. 3 of the drawing.

17. A composition of matter as in claim 16 containing essentially 100% non-elemental nickel.

18. A composition of matter as in claim 16 containing a dopant.

19. A composition of matter as in claim 18 wherein said dopant is selected from the group of cobalt, cadmium, lithium and barium.

20. A composition of matter as in claim 16 wherein elemental nickel contained therein is an ultra-fine particulate form.

21. A composition of matter as in claim 16 in association with mechanical elements and electrolyte in a rechargeable electrochemical cell.

22. A composition of matter as in claim 21 wherein said mechanical elements and electrolyte are constituents of a nickel-cadmium rechargeable electrochemical cell.

23. A composition of matter as in claim 21 wherein said mechanical elements and electrolyte are constituents of a nickel-iron rechargeable electrochemical cell.

* * * * *